(12) United States Patent
Zhao et al.

(10) Patent No.: US 12,289,710 B2
(45) Date of Patent: *Apr. 29, 2025

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, Victoria (AU); Yanan Lin, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 375 days.

This patent is subject to a terminal disclaimer.

(21) Appl. No.: 17/856,324

(22) Filed: Jul. 1, 2022

(65) Prior Publication Data

US 2022/0338174 A1    Oct. 20, 2022

Related U.S. Application Data

(63) Continuation of application No. PCT/CN2020/070318, filed on Jan. 3, 2020.

(51) Int. Cl.
*H04W 72/04* (2023.01)
*H04L 1/00* (2006.01)
(Continued)

(52) U.S. Cl.
CPC .......... *H04W 72/02* (2013.01); *H04L 1/0061* (2013.01); *H04L 5/0051* (2013.01);
(Continued)

(58) Field of Classification Search
CPC ... H04L 1/0026; H04L 1/0061; H04L 1/1861; H04L 5/0044; H04L 5/0048;
(Continued)

(56) References Cited

U.S. PATENT DOCUMENTS

2020/0022089 A1* 1/2020 Guo .................. H04W 52/26
2022/0330241 A1* 10/2022 Zhao ................. H04L 5/0048

FOREIGN PATENT DOCUMENTS

CN    107995605 A    5/2018
CN    108322414 A    7/2018
(Continued)

OTHER PUBLICATIONS

International Search Report and Written Opinion dated Sep. 4, 2020 in International Application No. PCT/CN2020/070318. English translation attached.
(Continued)

*Primary Examiner* — Phuc H Tran
(74) *Attorney, Agent, or Firm* — Sheppard, Mullin, Richter & Hampton LLP

(57) ABSTRACT

A wireless communication method and a terminal device are provided. The method includes: receiving, by a first terminal, a sidelink data channel and/or a sidelink reference signal transmitted by a second terminal; transmitting, by the first terminal, a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit.

17 Claims, 6 Drawing Sheets

(51) Int. Cl.
  *H04L 5/00*     (2006.01)
  *H04W 72/02*    (2009.01)
  *H04W 72/0446*  (2023.01)
  *H04W 72/0453*  (2023.01)
  *H04W 72/20*    (2023.01)

(52) U.S. Cl.
  CPC ... *H04W 72/0446* (2013.01); *H04W 72/0453* (2013.01); *H04W 72/20* (2023.01)

(58) Field of Classification Search
  CPC ... H04L 5/0051; H04L 5/0055; H04L 5/0091; H04W 72/02; H04W 72/0446; H04W 72/0453; H04W 72/20; H04W 72/25; H04W 92/18
  See application file for complete search history.

(56) References Cited

FOREIGN PATENT DOCUMENTS

| CN | 110311762 A | 10/2019 | |
| CN | 110381599 A * | 10/2019 | H04B 7/0626 |
| KR | 20200127827 A * | 11/2020 | H04W 72/51 |
| WO | 2019019184 A1 | 1/2019 | |

OTHER PUBLICATIONS

Intel Corporation. "Sidelink Physical Structure for NR V2X Communication", 3GPP TSG RAN WG1 RAN1#96bis R1-1904294, Apr. 12, 2019 (Apr. 12, 2019), sections 2 and 4.

Huawei et al. "Sidelink Physical Structure for NR V2X Communication", 3GPP TSG RAN WG1 Meeting #96bis R1-1903943, Apr. 12, 2019 (Apr. 12, 2019), sections 2.1 and 3.2.2.

Extended European Search Report dated Dec. 21, 2022 received in European Patent Application No. EP20910108.8.

Samsung:"Considerations on Sidelink CSI", 3GPP Draft;R1-1902279,3rd Generation Partnership Project(3GPP), Mobile Competence Centre ; 650, Route Des Lucioles ; F-06921 Sophia-Antipolis Cedex; France vol. RAN WG1, No. Athens, Greece; Feb. 25, 2019-Mar. 1, 2019, Feb. 15, 2019 (Feb. 15, 2019),XP051599974.

Samsung :"On Physical Layer Proceduresfor NR V2X",3GPP Draft;R1-1902274,3rd Generation Partnership Project (3GPP), Mobile Competence Centre ;650,Route Des Lucioles ; F-06921 Sophia-Antipolis Cedex; France vol. RANWG1, No. Athens,Greece ;Feb. 25, 2019-Mar. 1, 2019, Feb. 15, 2019 (Feb. 15, 2019),XP051599969.

* cited by examiner

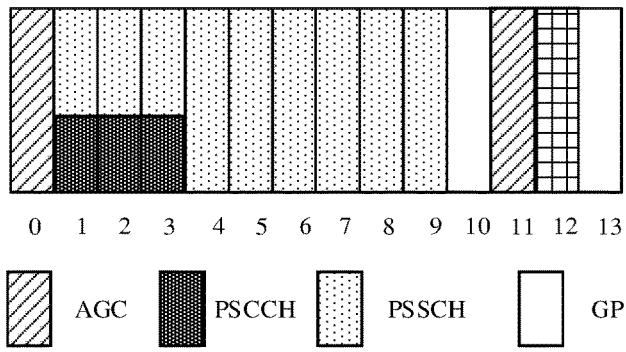

FIG. 3

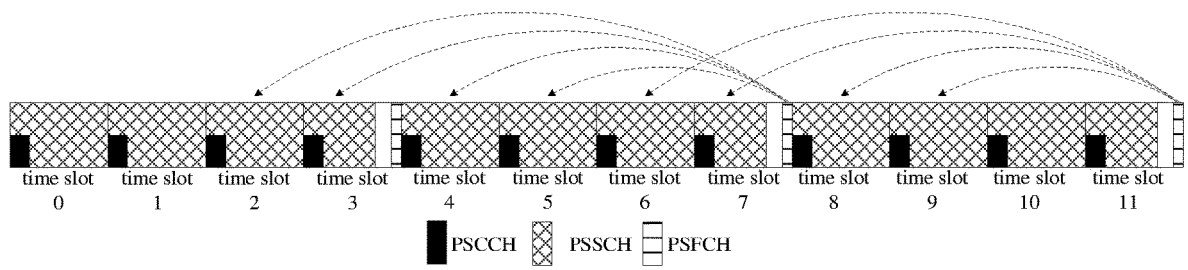

| Receiving, by a first terminal, a sidelink data channel and/or a sidelink reference signal transmitted by a second terminal | — S210 |

| Transmitting, by the first terminal, a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit | — S220 |

FIG. 5

WIRELESS COMMUNICATION METHOD AND TERMINAL DEVICE

CROSS-REFERENCE TO RELATED APPLICATIONS

The present application is a continuation of International Application No. PCT/CN2020/070318 filed on Jan. 3, 2020, which is hereby incorporated by reference in its entirety.

FIELD

Embodiments of the present disclosure relate to the field of communication technology, and more particularly, to a wireless communication method and a terminal device.

BACKGROUND

An internet-of-vehicle system is a SideLink (SL) transmission technology based on a Long Term Evaluation Device to Device (LTE D2D), and is different from a traditional LTE system in which transmission data is received or transmitted via a base station. The internet-of-vehicle system adopts a direct terminal-to-terminal communication, thereby achieving a higher spectral efficiency and a lower transmission delay.

In the internet-of-vehicle system, in order to improve the transmission reliability, a sidelink feedback channel is introduced. Under a condition that the sidelink feedback is activated, a receiving terminal may transmit sidelink feedback information to a transmitting terminal, so that the transmitting terminal may determine whether to perform data retransmission based on the sidelink feedback information.

At present, considering that the internet-of-vehicle system supports multi-carrier sidelink transmission, a Physical Sidelink Shared CHannel (PSSCH) on each carrier needs corresponding feedback information, or one Physical Sidelink Shared CHannel (PSSCH) supports transmission of multiple Transport Blocks (TBs), and each TB needs its corresponding feedback information. In this case, performing sidelink feedback to improve reliability of the sidelink transmission is an urgent problem to be solved.

SUMMARY

Embodiments of the present disclosure provide a wireless communication method and a terminal device, which can realize multi-bit sidelink feedback.

In a first aspect, a wireless communication method is provided. The method includes: receiving, by a first terminal, a sidelink data channel and/or a sidelink reference signal transmitted by a second terminal; transmitting, by the first terminal, a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit.

In a second aspect, a terminal device is provided. The terminal device is configured to perform the method in the first aspect or any possible implementation of the first aspect. In particular, the terminal device includes units for performing the method of the first aspect or any possible implementation of the first aspect.

In a third aspect, a terminal device is provided. The terminal device includes a processor and a memory. The memory is configured to store a computer program, and the processor is configured to invoke and execute the computer program stored in the memory to perform the method of the first aspect or any implementation of the first aspect.

In a fourth aspect, a chip is provided for implementing the method of any one of the first aspect and the second aspect or any implementations thereof.

Specifically, the chip includes a processor. The processor is configured to invoke and execute a computer program stored in a memory to cause a device provided with the chip to perform the method of the first aspect or any implementation of the first aspect.

In a fifth aspect, a computer-readable storage medium is provided. The computer-readable storage medium is configured to store a computer program that enables a computer to perform the method of the first aspect or any implementation of the first aspect.

In a sixth aspect, a computer program product is provided. The computer program includes computer program instructions that cause a computer to perform the method of the first aspect or any implementation of the first aspect.

In a seventh aspect, a computer program is provided. When run on a computer, the computer program causes the computer to perform the method of the first aspect or any implementation of the first aspect.

Based on the above technical solution, the first terminal can receive the sidelink data channel and/or the sidelink reference signal transmitted by the second terminal, and determine that feedback information of multiple bits needs to be fed back. Further, the first terminal can feed back the feedback information of multiple bits through one sidelink feedback channel, which is beneficial to reducing feedback overhead. In addition, the second terminal can determine whether to perform data retransmission based on the sidelink feedback channel, so as to improve reliability of the data transmission.

BRIEF DESCRIPTION OF DRAWINGS

FIG. 3 is a schematic diagram of a structure of a PSFCH carrying feedback information of one bit;

FIG. 4 is a schematic diagram illustrating an example of side feedback;

FIG. 5 is a schematic diagram of a wireless communication method according to an embodiment of the present disclosure;

DESCRIPTION OF EMBODIMENTS

Figure 1:
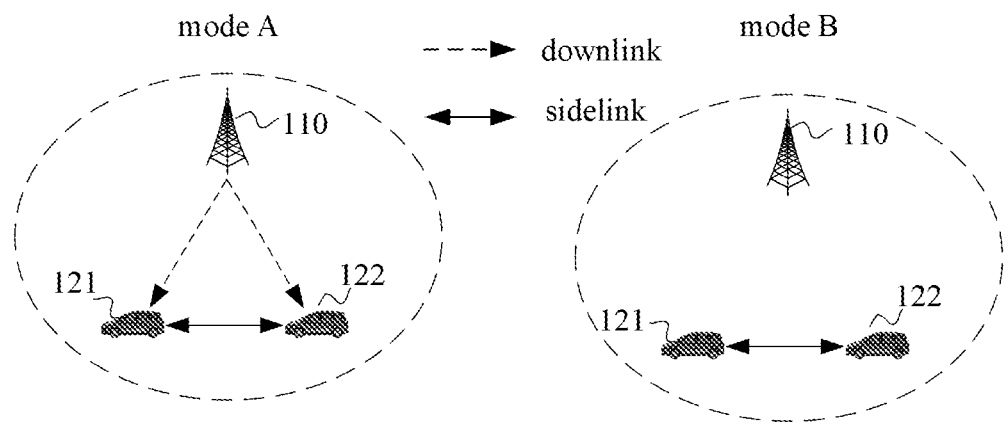
FIG. 1 is a schematic diagram of an application scenario according to an embodiment of the present disclosure.

The technical solutions in the embodiments of the present disclosure will be described below with reference to the drawings in the embodiments of the present disclosure. It is obvious that the described embodiments are some embodiments of the present disclosure, but not all embodiments. All other embodiments obtained by a person of ordinary skill in the art based on the embodiments in the present disclosure without making any creative effort belong to the protection scope of the present disclosure.

It should be understood that the technical solutions of the embodiments of the present disclosure may be applied in a Device to Device (D2D) communication system, for example, an internet-of-vehicle system that performs the D2D communication based on Long Term Evolution (LTE), or an NR-V2X system. Unlike the conventional LTE system in which communication data between terminals is received or transmitted through a network device (e.g., a base station), the internet-of-vehicle system employs a Device to Device direct communication, and thus has higher spectral efficiency and lower transmission delay.

Optionally, the communication system on which the internet-of-vehicle system is based may be a Global System of Mobile communication (GSM) System, a Code Division Multiple Access (CDMA) System, a Wideband Code Division Multiple Access (WCDMA) System, a General Packet Radio Service (GPRS), an LTE System, an LTE Frequency Division Duplex (FDD) System, an LTE Time Division Duplex (TDD), a Universal Mobile Telecommunications System (UMTS), a Worldwide Interoperability for Microwave Access (WiMAX) communication System, a 5G New Radio (NR) System, or the like.

The network device in embodiments of the present disclosure may be a base station such as Base Transceiver Station (BTS) in a GSM system or a CDMA system, a base station such as NodeB (NB) in a WCDMA system, an evolutional base station such as Evolutional Node B (eNB, or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device such as a gNB in a NR network, or a network device in a future evolved Public Land Mobile Network (PLMN), etc.

The terminal device in embodiments of the present disclosure may be a terminal device capable of implementing a D2D communication. For example, the terminal device may be a vehicle-mounted terminal device, a terminal device in an LTE system (such as LTE UE), a terminal device in an NR Network (such as NR UE), or a terminal device in a future evolved Public Land Mobile Network (PLMN), which is not limited herein.

The D2D communication technology can be applied in a Vehicle-to-Vehicle (V2V) communication or a Vehicle to Everything (V2X) communication. In the V2X communication, X may generally refer to any device with wireless receiving and transmitting capabilities, such as but not limited to a slow-moving wireless apparatus, a fast-moving vehicle-mounted device, or a network control node with wireless transmitting and receiving capabilities. It should be understood that the embodiments of the present disclosure are mainly applied in a scenario of the V2X communication, but may also be applied in any other D2D communication scenario, which is not limited in the embodiments of the present disclosure.

FIG. 1 is a schematic diagram of an application scenario of an embodiment of the present disclosure. FIG. 1 exemplarily shows one network device and two terminal devices. Optionally, the wireless communication system in the embodiment of the present disclosure may include a plurality of network devices and the coverage of each network device may include a different number of terminal devices. The embodiments of the present disclosure are not limited to any of these examples.

It should be understood that terms "system" and "network" in the present disclosure are often used interchangeably herein. The term "and/or" in the present disclosure is only an association relationship between correlated objects, including three relationships. For example, "A and/or B" may mean A only, B only, or both A and B. In addition, the symbol "/" as used herein generally represents an "or" relationship between the correlated objects preceding and succeeding the symbol.

Optionally, the wireless communication system may further include other network entities such as a Mobile Management Entity (MME), a Serving GateWay (S-GW), a Packet data network GateWay (P-GW). Alternatively, the wireless communication system may further include a Session Management Function (SMF), a Unified Data Management (UDM), an AUthentication Server Function (AUSF). The embodiments of the present disclosure are not limited to any of these examples.

In the internet-of-vehicle system, the terminal device can adopt a mode A and a mode B for communication.

Specifically, the terminal device 121 and the terminal device 122 can communicate through a D2D communication mode. When D2D communication is performed, the terminal device 121 and the terminal device 122 directly communicate through a D2D link, i.e., a SideLink (SL). In mode A, a transmission resource of the terminal device is allocated by a base station, and the terminal device may transmit data on the SL based on the resource allocated by the base station. The base station may allocate a resource for a single transmission to the terminal device, or may allocate a resource for a semi-static transmission to the terminal device. In mode B, the terminal device autonomously selects a transmission resource from the SL resources. Specifically, the terminal device obtains an available transmission resource in a resource pool through interception, or the terminal device randomly selects a transmission resource from the resource pool.

It should be understood that the above-mentioned mode A and mode B are only exemplary to illustrate two transmission modes, and other transmission modes may be defined. For example, mode 1 and mode 2 are introduced in an NR-V2X, in which mode 1 indicates that a sidelink transmission resource of the terminal device is allocated by the base station. The manners in which the base station allocates the sidelink transmission resource using mode A and mode 1 may be different. For example, one of the mode A and the mode 1 may adopt dynamic scheduling, the other may adopt semi-static scheduling or semi-static plus dynamic scheduling, etc. Mode 2 indicates that the sidelink transmission resource of the terminal device is selected by the terminal.

Figure 2:
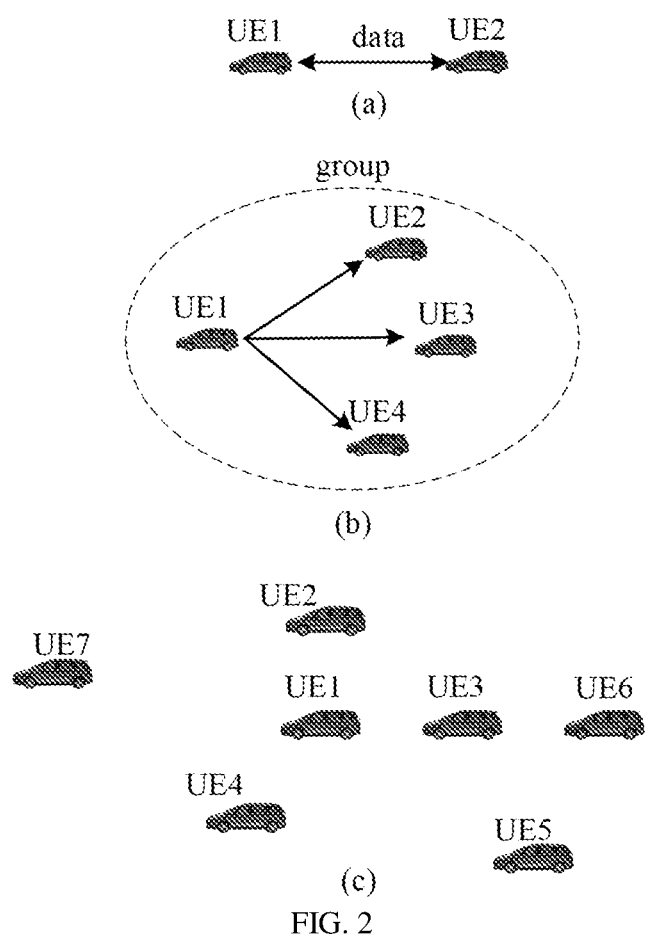
FIG. 2 is a schematic diagram of several communication modes between terminal devices.

In a New Radio (NR)-based Vehicle-to-Everything (V2X) system (NR-V2X), a plurality of transmission modes can be supported. The plurality of transmission modes may include a unicast transmission mode, a multicast transmission mode, and a broadcast transmission mode. In the unicast transmission mode, only one terminal is a receiving terminal. As shown in FIG. 2(a), the transmission between UE1 and UE2 is a unicast transmission. In the multicast transmission mode, all terminals in a communication group, or all terminals within a certain transmission distance are receiving terminals. As shown in FIG. 2(b), UE1, UE2, UE3, and UE4 form a communication group, in which UE1 transmits data, and all other terminal devices in the communication group are receiving terminals. In the broadcast transmission mode, any terminal may be a receiving terminal. As shown in FIG. 2(c), the UE1 is a transmitting terminal, and other terminals around UE1 may be receiving terminals.

In the NR-V2X system, in order to improve transmission reliability, a Sidelink Feedback Channel, for example, a Physical Sidelink Feedback CHannel (PSFCH), is introduced. For a unicast transmission, a transmitting terminal transmits sidelink data (including PSCCH and PSSCH) to a receiving terminal, the receiving terminal can transmit Hybrid Automatic Repeat reQuest (HARQ) sidelink feedback information to the transmitting terminal, and the transmitting terminal can determine whether retransmission is needed based on the sidelink feedback information from the receiving terminal. Here, the HARQ sidelink feedback information can be carried in a sidelink feedback channel.

The PSFCH only carries sidelink feedback information of one bit, and occupies two time domain symbols in the time domain. The two time domain symbols carry the same sidelink feedback information, data in one of the two time domain symbols is a repetition of data in the other time domain symbol. For example, a second time domain symbol carries the sidelink feedback information, data in the first time domain symbol is a copy of data in the second time domain symbol, and the first time domain symbol is used as an Automatic Gain Control (AGC). The PSFCH occupies one Physical Resource Block (PRB) in the frequency domain. FIG. 3 is an example of a structure of a PSFCH and a Physical Sidelink Shared CHannel (PSSCH)/Physical Sidelink Control CHannel (PSCCH). In particular, FIG. 3 illustrates positions of time domain symbols occupied by the PSFCH, the PSCCH and the PSSCH in a slot. In a slot, the last symbol (i.e., a domain symbol 13) can be used as a Guard Period (GP), a second-to-last symbol (i.e., a domain symbol 12) can be used for PSFCH transmission, data on a third-to-last symbol is the same as data on the second-to-last symbol and is used as AGC, a fourth-to-last symbol is also used as GP, the first symbol in the slot is used as AGC, data on the first symbol is the same as data on the second symbol in the slot. PSCCH occupies three time domain symbols, that is, a time domain symbol 1, a time domain symbol 2, and a time domain symbol 3. Time domain symbols 1 to 9 are used for PSSCH transmission. The PSCCH and PSSCH occupy different frequency domain resources on the time domain symbol 1, the time domain symbol 2, and the time domain symbol 3.

It should be understood that the number and the positions of the time domain symbols occupied by the PSCCH and the positions of the time domain symbols occupied by the PSFCH illustrated in FIG. 3 are only examples, and the embodiment of the present disclosure is not limited thereto.

Further, in order to reduce the overhead of the PSFCH, one slot in every N slots is defined to include a PSFCH transmission resource, e.g., N=1, 2 or 4, where N may be preconfigured or configured by the network device. FIG. 4 is a schematic diagram of N=4. PSSCHs are transmitted in slots 2, 3, 4, and 5, feedback information corresponding to the PSSCHs is transmitted in slot 7. Therefore, slots 2, 3, 4, and 5 may be considered as a set of slots {2, 3, 4, 5}, the PSSCHs are transmitted in the set of slots, and PSFCHs corresponding to the PSSCHs may be transmitted in a same slot.

The existing PSFCH design cannot meet the transmission requirement under the following cases where feedback information of multiple bits need to be fed back.

Case 1: the PSSCH supports transmission of multiple Transport Blocks (TBs), and the PSFCH needs to carry feedback information of multiple bits. For example, PSSCH transmission supporting 4 or 8 layers corresponds to 2 TB blocks, each TB requires corresponding feedback information, thus the PSFCH needs to carry feedback information of 2 bits.

Case 2: feedback based on Code Block Group (CBG) is supported. For example, one TB may be divided into a plurality of CBGs, and feedback information corresponding to each of the plurality of CBGs is required, so that when a transmitting terminal transmits one TB, a receiving terminal needs to feed back the feedback information corresponding to each of the plurality of CBGs, and a plurality of bits are needed.

Case 3: A period N of the feedback channel is greater than 1. For example, as shown in FIG. 4, the transmitting terminal may transmit PSSCHs to the receiving terminal in multiple slots. For example, the transmitting terminal transmits a PSSCH to the receiving terminal in each of slot 0, slot 1 and slot 2, and the receiving terminal is required to transmit feedback information corresponding to each PSSCH, so that the receiving terminal is required to transmit feedback information of 3 bits in slot 5.

Case 4: the HARQ feedback Information and Channel State Information (CSI) are supported to be fed back simultaneously, the HARQ feedback Information and the CSI need to be multiplexed into a sidelink feedback Channel for feedback, and feedback information of multiple bits is needed.

Case 5: multi-carrier feedback is supported. For example, if a transmitting terminal transmits PSSCHs on multiple carriers, each PSSCH needs corresponding feedback information. In order to reduce the overhead of feedback resources, the feedback information on the multiple carriers needs to be multiplexed into one sidelink feedback channel, therefore the sidelink feedback channel needs to carry feedback information of multiple bits.

In view of this, how to design a feedback channel for carrying feedback information of multiple bits is an urgent problem to be solved.

FIG. 5 is a schematic flow chart of a wireless communication method 200 according to an embodiment of the present disclosure. The method 200 may be performed by a terminal device in the communication system shown in FIG. 1. As shown in FIG. 5, the method 200 may include at least part of the following contents.

At S210, the first terminal receives a sidelink data channel and/or a sidelink reference signal transmitted by a second terminal.

At S220, the first terminal transmits a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit.

For convenience of differentiation and illustration, in the embodiments of the present disclosure, the sidelink feedback channel for carrying feedback information of one bit is denoted as a first-type sidelink feedback channel, and a sidelink feedback channel for carrying feedback information of multiple bits may include at least one of a second-type sidelink feedback channel and a third-type sidelink feedback channel, that is, the first sidelink feedback channel may be the second-type sidelink feedback channel or the third-type sidelink feedback channel.

Figure 6:
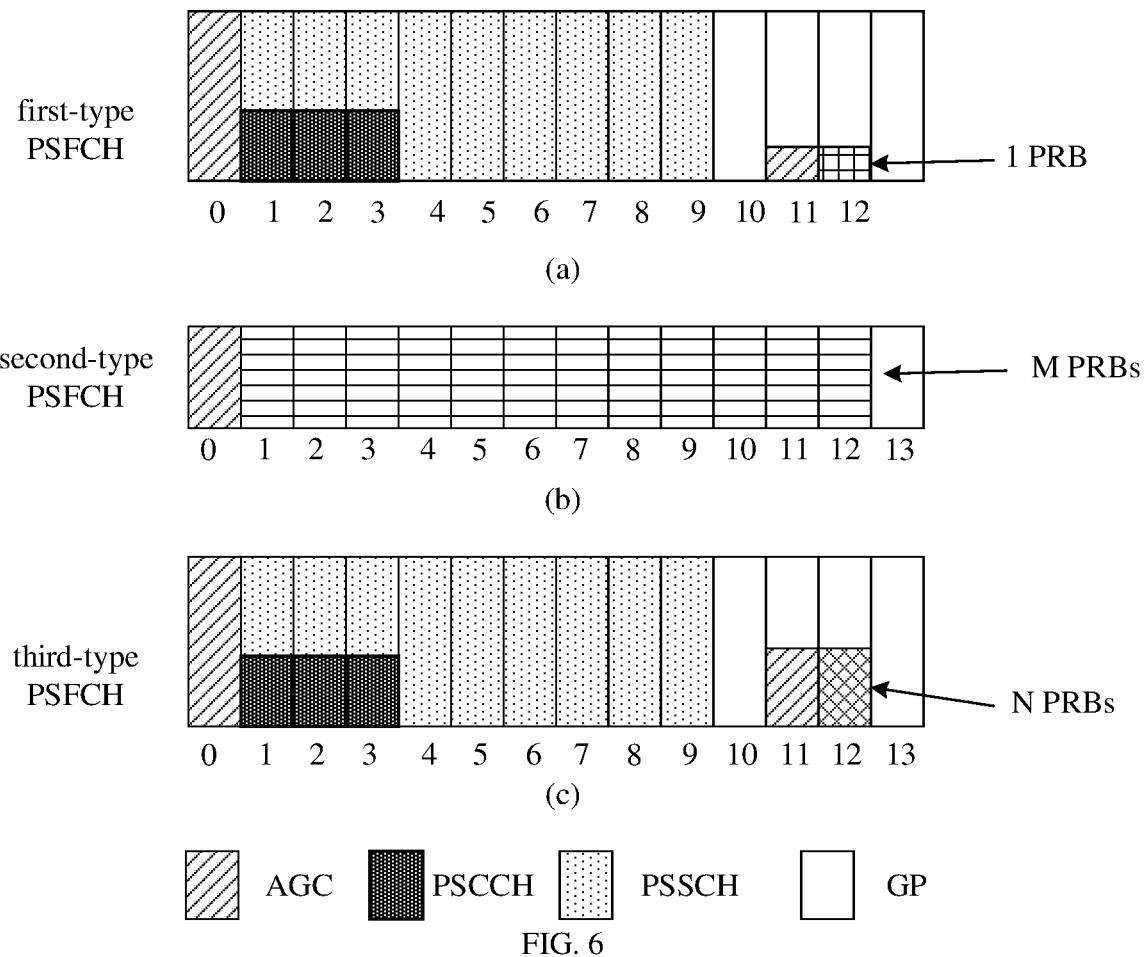
FIG. 6 is a schematic diagram of time domain symbols occupied by a first-type PSFCH, a second-type PSFCH, and a third-type PSFCH according to an embodiment of the present disclosure.

As shown in FIG. 6(b), the second-type sidelink feedback channel occupies all time domain symbols in a slot in the time domain that are available for sidelink transmission. Further, the second-type sidelink feedback channel may occupy M PRB s in the frequency domain, where M is a positive integer. That is, the second-type sidelink feedback channel may occupy one or multiple PRBs in the frequency domain.

Optionally, M is predefined, or preconfigured, or configured by the network device. For example, the network device may include the parameter M in resource pool configuration information of the second-type sidelink feedback channel.

As shown in FIG. 6(c), the third-type sidelink feedback channel occupies two time domain symbols in a slot in the time domain that are available for sidelink transmission. For example, the two time domain symbols are the same as the time domain symbols occupied by the first-type sidelink feedback channel, that is, a second-to-last time domain symbol and a third-to-last time domain symbol. Further, the third-type sidelink feedback channel may occupy N PRB s in the frequency domain, where N is greater than 1.

Optionally, N is predefined, or preconfigured, or configured by the network device. For example, the network device may include the parameter N in resource pool configuration information of the third-type sidelink feedback channel.

Optionally, the sidelink reference signal in the embodiments of the present disclosure may include, for example, a SideLink Synchronization Signal (SLSS), a Sidelink Synchronization Signal Block (S-SSB), a SideLink Channel State Information Reference Signal (SL CSI-RS), a DeModulation Reference Signal (DMRS). The S-SSB may include a Sidelink Primary Synchronization Signal (S-PSS) and an Sidelink Secondary Synchronization Signal (S-SSS), etc. The DMRS includes a PSSCH-DMRS, a PSCCH DMRS and a PSBCH DMRS.

It should be understood that the embodiments of the present disclosure may be applicable in various scenarios requiring feedback of feedback information of multiple bits.

As an example scenario, the first terminal may receive a sidelink data channel transmitted by the second terminal, and the feedback information of the sidelink data channel needs multiple bits. It should be understood that, in the embodiments of the present disclosure, the number of the sidelink data channel(s) transmitted by the second terminal and received by the first terminal is not limited.

Optionally, the feedback information of multiple bits may be feedback information of multiple TBs transmitted in one sidelink data channel (for example, the foregoing case 1), feedback information of multiple CBGs of one TB in a sidelink data channel (for example, the foregoing case 2), feedback information of sidelink data channels transmitted in multiple slots (for example, the foregoing case 3), or feedback information of sidelink data channels transmitted in multiple carriers (for example, the foregoing case 5).

As another exemplary scenario, the first terminal may receive a sidelink reference signal transmitted by the second terminal, and feedback of a measurement result of the sidelink reference signal requires multiple bits.

As still another exemplary scenario, the first terminal may receive a sidelink data channel and a sidelink reference signal transmitted by the second terminal, and multiple bits are required for the combined feedback of the feedback information of the sidelink data channel and the measurement result of the sidelink reference signal, for example, in the foregoing case 4.

In the embodiment of the present disclosure, feedback in a first exemplary scenario is taken as an example for description. Implementations of other scenarios are similar, and details thereof are omitted herein for brevity.

The following describes channel designs of the second-type sidelink feedback channel and the third-type sidelink feedback channel in conjunction with embodiments.

Embodiment 1: Channel Design of the Second-Type Sidelink Feedback Channel

Figure 7:
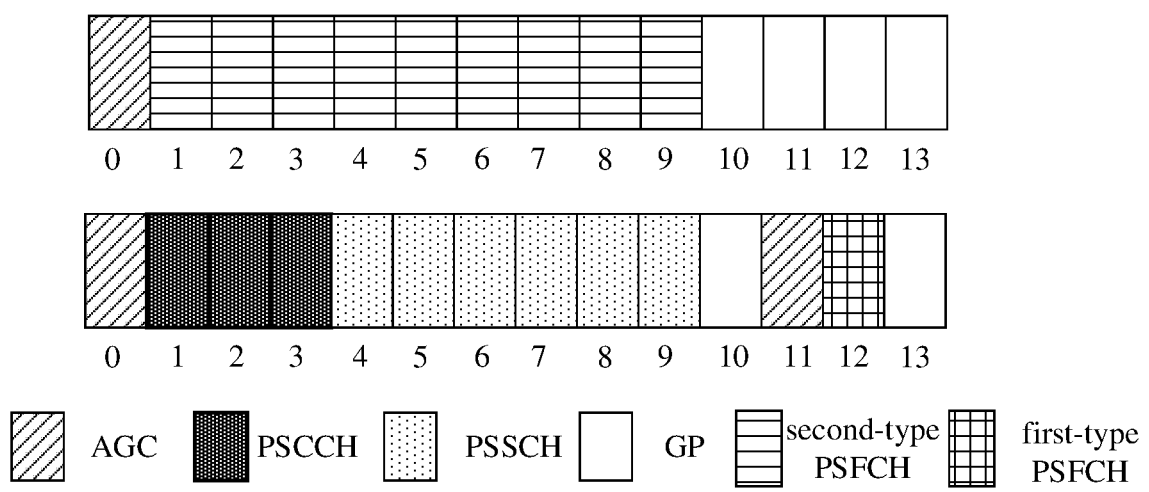
FIG. 7 is another schematic diagram of a time domain symbol occupied by a second-type PSFCH according to another embodiment of the present disclosure.

Optionally, as shown in FIG. 6(b) and FIG. 7, the last time domain symbol of all time domain symbols in a slot that are available for sidelink transmission is not used for transmitting the second-type sidelink feedback channel. For example, the last time domain symbol is used as GP.

Optionally, as shown in FIG. 6(b) and FIG. 7, a first time domain symbol of all time domain symbols in a slot that are available for sidelink transmission is not used for transmitting the second-type sidelink feedback channel. For example, the first time domain symbol is used as AGC.

Optionally, data on a first time domain symbol of all time domain symbols in a slot that are available for sidelink transmission is a copy or a replica of data on a second time domain symbol in the slot that are available for sidelink transmission. That is, data on a first time domain symbol and data on a second time domain symbol are the same, the first time domain symbol and the second time domain symbol are available for sidelink transmission.

Optionally, when the second-type sidelink feedback channel uses a same slot with the first-type sidelink feedback channel or the third-type sidelink feedback channel, time domain symbols used for transmitting the first-type sidelink feedback channel and the third-type sidelink feedback channel are not used for transmitting the second-type sidelink feedback channel, that is, time domain symbols for the second-type sidelink feedback channel include no time domain symbol for the first-type sidelink feedback channel and no time domain symbol for the third-type sidelink feedback channel.

For example, as shown in FIG. 7, a time domain symbol 11 and a time domain symbol 12 are used for transmitting the first-type sidelink feedback channel, the time domain symbol 11 and the time domain symbol 12 are not used for transmitting the second-type sidelink feedback channel. Further, the time domain symbol 10 is also not used for transmitting the second-type sidelink feedback channel, and is used as a GP.

Further, a DeModulation Reference Signal (DMRS) sequence of the second-type sidelink feedback channel and the second-type sidelink feedback channel may be designed to be in time division.

That is, a time domain symbol used for transmitting the DMRS sequence of the second-type sidelink feedback channel and a time domain symbol used for transmitting the second-type sidelink feedback channel are different.

Optionally, in some embodiments, the number and/or the positions of the time domain symbols of the DMRS sequence of the second-type sidelink feedback channel in a slot can be configured. For example, the above configuration information of the DMRS sequence may be included in the resource pool configuration information of the second-type sidelink feedback channel.

Figure 8:
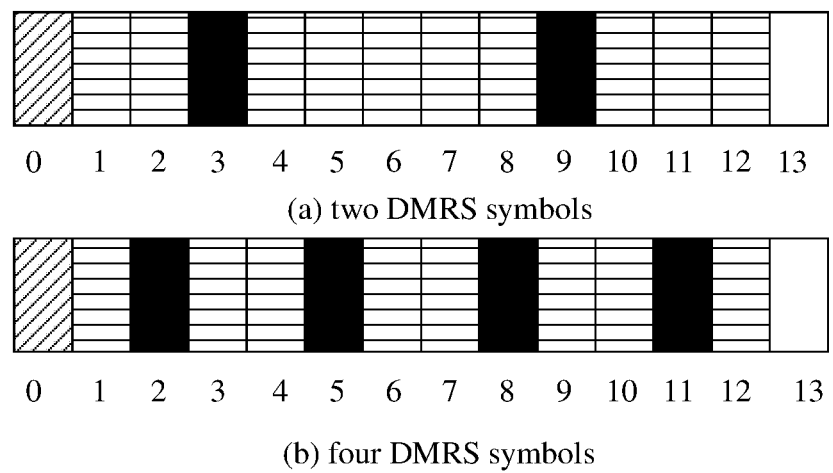
FIG. 8 is a schematic diagram of a time domain symbol occupied by a DMRS sequence according to an embodiment of the present disclosure.
Figure 9:
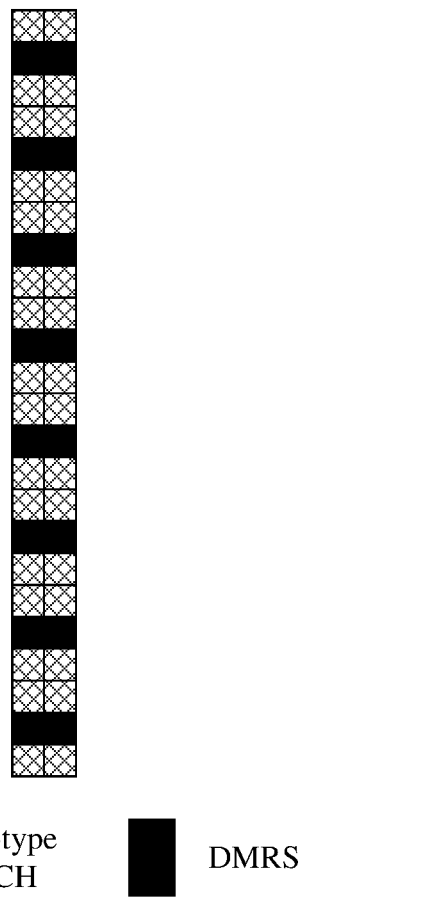
FIG. 9 is a schematic diagram of frequency domain units occupied by a third-type PSFCH and a DMRS sequence corresponding to the third-type PSFCH.

FIG. 8 illustrates two DMRS configurations, that is, two DMRS patterns. In FIG. 8(a), the number of time-domain symbols for transmitting a DMRS sequence in a slot can be configured as 2, and a time-domain symbol 3 and a time-domain symbol 9 are occupied. In FIG. 8(b), the number of time domain symbols used for transmitting a DMRS sequence in a slot may be configured as 4, and a time domain symbol 2, a time domain symbol 5, a time domain symbol 8, and a time domain symbol 11 are occupied.

In the embodiments of the present disclosure, when a plurality of DMRS patterns are configured, the first terminal may determine a target DMRS pattern used for transmitting the second-type sidelink feedback channel.

As an embodiment, the first terminal may determine the target DMRS pattern based on first information, the first information indicating a specific DMRS pattern.

Optionally, in some embodiments, the first information may be transmitted by the second terminal, for example, the second terminal may carry the first information in Sidelink Control Information (SCI). Alternatively, the first information may be transmitted through a PC5-RRC signaling. Specifically, when the first terminal and the second terminal establish a connection, the first terminal and the second terminal may perform interaction of configuration information through the PC5-RRC signaling, and the configuration information may carry the first information.

Optionally, in some other embodiments, the first information may be configured by the network device, for example, the network device may configure the first information through a broadcast message (e.g., a System Information Block (SIB)) or Radio Resource Control (RRC) signaling.

Optionally, in other embodiments, the first information may be configured by a cluster head terminal, which may refer to a terminal having functions such as resource management, resource allocation, resource scheduling and resource coordination in a communication group of multicast communication, such as a first vehicle in a fleet of vehicles travelling in a queue or a vehicle at an intermediate position of the fleet of vehicles. For example, the cluster head terminal may transmit the first information through SCI or a PC5-RRC signaling, or may configure a DMRS pattern used by a terminal in the communication group to transmit PSFCH during an intra-group communication.

Optionally, in some embodiments of the present disclosure, the DMRS sequence of the second-type sidelink feedback channel is determined based on at least one of: terminal identity information of the first terminal, that is terminal identity information of a receiving terminal of the PSSCH; terminal identity information of the second terminal, that is, terminal identity information of a transmitting terminal of the PSSCH; or a Cyclic Redundancy Check (CRC) sequence generated based on the SCI transmitted by the second terminal.

In some scenarios, when two PSSCH transmitting terminals transmit PSSCHs using the same resource, the transmission resources of PSFCHs corresponding to the PSSCHs are also the same. In this case, a DMRS sequence is generated based on the identity information of the PSSCH transmitting terminals, which may reduce interference between transmissions of multiple PSFCHs.

In some other scenarios, for the second feedback method in multicast communication, terminals in each communication group need to transmit feedback information, and multiple terminals may share the same feedback resource. However, different sequences are used for multiplexing, that is, a CDM multiplexing method is used. Therefore, generating a DMRS sequence based on identity information of a receiving terminal can reduce interference between multiple terminals in a communication group.

In some other scenarios, PSSCHs transmitted by different terminals usually have different SCIs corresponding to the PSSCHs, and thus CRC sequences generated based on the SCIs are also different. Therefore, determining the DMRS sequence based on the CRC sequences can avoid interference between different terminals.

Optionally, in some embodiments, the SCI may be a second-order SCI.

As an example, the DMRS sequence may be a sequence having a low Peak Average Power Ratio (PAPR) characteristic.

Optionally, in some embodiments, the Cyclic Shift of the DMRS sequence can be determined based on the identity information of the transmitting terminal (i.e., the transmitting terminal of the PSSCH), i.e., the terminal identity information of the second terminal, or the identity information of the receiving terminal (i.e., the receiving terminal of the PSSCH), i.e., the terminal identity information of the first terminal.

Optionally, in some other embodiments, the cyclic shift of the DMRS sequence is generated based on a CRC sequence of a second-order SCI sequence corresponding to the PSSCH. Specifically, when determining a root sequence or the cyclic shift of the DMRS sequence, a parameter nm can be determined based on the terminal identity information of the first terminal, the terminal identity information of the second terminal, or the CRC sequence.

For example, it can be determined that $n_{ID}$=Layer-1 source ID, or $n_{ID}$=Layer-1 destination ID, or $n_{ID}$ is determined from the lowest 16 bits of the CRC of the first-order SCI. The Layer-1 source ID represents the Layer 1 identity information of the PSSCH transmitting (namely the second terminal), and the Layer-1 destination ID represents the Layer 1 identity information of the PSSCH receiving terminal (namely the first terminal).

As another example, the DMRS sequence is generated by a pseudo-random sequence.

Optionally, an initialized value $c_{init}$ of the pseudo random sequence can be determined based on the terminal identity information of the first terminal, the terminal identity information of the second terminal, or the CRC sequence. As an example, the parameter $c_{init}$ is determined by a parameter $N_{ID}^0$ which can be determined based on the above information. For example, $N_{ID}^0$=Layer-1 source ID, or $N_{ID}^0$=Layer-1 destination ID, or $N_{ID}^0$ is determined by the lowest 16 bits of CRC of the second-order SCI. The Layer-1 source ID represents the Layer-1 identity information of a PSSCH transmitting terminal, and the Layer-1 destination ID represents the Layer-1 identity information of a PSSCH receiving terminal.

Optionally, in some embodiments of the present disclosure, a scrambling sequence for scrambling the sidelink feedback information or the measurement result is determined based on at least one of: terminal identity information of the first terminal, i.e., terminal identity information of the receiving terminal of the PSSCH; terminal identity information of the second terminal, i.e., terminal identity information of the transmitting terminal of the PSSCH; or a Cyclic Redundancy Check (CRC) sequence generated based on SCI transmitted by the second terminal.

The scrambling sequence of the PSFCH is determined and generated based on the terminal identity information of the receiving terminal of the PSSCH, the terminal identity information of the transmitting terminal of the PSSCH or the CRC sequence of the SCI, so that the interference of the PSFCH among different terminals can be reduced.

Specifically, after a bit sequence of the sidelink feedback information is subjected to a processing such as a channel coding, a scrambling processing is required before a constellation modulation is performed, so as to reduce interference between terminals.

In some embodiments, the sidelink feedback information or the measurement result is scrambled through the following formula of:

$$\tilde{b}(i)=(b(i)+c(i))\bmod 2,$$

Where the bit sequence $b(0), \ldots, b(M_{bit}-1)$ is a coded sequence, $M_{bit}$ represents a bit length after coding, and $\tilde{b}(0), \ldots, \tilde{b}(M_{bit}-1)$ represents a scrambled sequence, and $c(i)$ represents a scrambling sequence which may be generated for example based on a pseudo random sequence. An initialization parameter $c_{init}$ of the pseudo random sequence can be determined based on the terminal identity information of the first terminal, the terminal identity information of the second terminal, or the CRC sequence.

As an example, $c_{init}$ can be determined based on the following formula of:

$$c_{init}=n_{RNTI}\times 2^{15}+n_{ID},$$

Where $n_{RNTI}$=Layer-1 source ID, or $n_{RNTI}$=Layer-1 destination ID, or $n_{RNTI}$ can be determined based on the lowest 10 bits of the CRC of the first-order SCI.

Optionally, in some embodiments, the terminal identity information of the first terminal is cell identity information of a cell to which the first terminal belongs, or intra-group identity information of a terminal or communication group to which the first terminal belongs.

For example, the cell identity information of the cell to which the first terminal belongs may be an SL-V-RNTI of the cell.

Optionally, in some embodiments, the terminal identity information of the second terminal is cell identity information of a cell to which the second terminal belongs, or intra-group identity information of a terminal or communication group to which the second terminal belongs.

For example, the cell identity information of the cell to which the second terminal belongs may be an SL-V-RNTI of the cell.

Embodiment 2: Channel Design for a Third-Type Sidelink Feedback Channel

In time domain, the third-type sidelink feedback channel occupies two time domain symbols in a slot. For example, as shown in FIG. 6(a) and FIG. 6(c), the time domain symbols occupied by the third-type sidelink feedback channel are the same as the time domain symbols occupied by the first-type sidelink feedback channel. That is, a second-to-last time domain symbol and a third-to-last time domain symbol, i.e., a time domain symbol 11 and a time domain symbol 12, that are available for sidelink transmission in a slot are occupied.

Optionally, data on one of the two time domain symbols occupied by the third-type sidelink feedback channel is a copy of data on the other of the two time domain symbols. For example, data on the time domain symbol 11 may be a copy of data on the time domain symbol 12.

Optionally, one time domain symbol after the third-type sidelink feedback channel is used as GP, i.e. no data is transmitted on this symbol.

In the frequency domain, the third-type sidelink feedback channel occupies N RPBs, where N is greater than 1.

On the time domain symbol carrying the third-type sidelink feedback channel, a DMRS sequence of the third-type sidelink feedback channel and the third-type sidelink feedback channel are in frequency division, that is, the DMRS sequence of the third-type sidelink feedback channel and the third-type sidelink feedback channel occupy different frequency domain units or subcarriers.

In some embodiments, the frequency domain units of two adjacent DMRS sequence are spaced by 3 subcarriers.

For example, the third-type PSFCH occupies two time domain symbols, data on one of the two time domain symbols is a copy of data on the other of the two time domain symbols, a DMRS sequence and data on each of the two time domain symbols are frequency-division multiplexed (FDM), and frequency domain units of two adjacent DMRS sequence are spaced by three subcarriers. For example, if the frequency domain unit of the first DRMS sequence is subcarrier 0, the frequency domain unit of the second DMRS sequence is subcarrier 3.

In the embodiment of the present disclosure, the first terminal may further determine an offset of a frequency domain position of a first DMRS sequence in one PRB relative to a first subcarrier, that is, whether the frequency domain position of the first DMRS sequence is subcarrier 0, subcarrier 1, or subcarrier 2. The first terminal may further determine a frequency domain position of other DMRS sequence based on the frequency domain position of the first DMRS sequence and an interval between two adjacent DMRS sequences.

In some embodiments, the first terminal may determine the offset based on at least one of: configuration information of the network device, configuration information of the cluster head terminal, indication information of the second terminal, a CRC sequence generated based on the SCI transmitted by the second terminal, identity information of the first terminal, identity information of the second terminal, or group identity information of a communication group to which the first terminal belongs. The indication information transmitted by the second terminal indicates the offset.

That is, the offset may be configured by the network device, configured by the cluster head terminal, configured by the second terminal, or determined based on specific information. The specific information may be, for example, a CRC sequence generated by the SCI transmitted by the second terminal, the identity information of the first terminal, the identity information of the second terminal, or the group identity information of a communication group to which the first terminal belongs.

Optionally, in some embodiments, the configuration information of the network device may be resource pool configuration information of the third-type sidelink feedback channel, that is, the resource pool configuration information of the third-type sidelink feedback channel may include configuration information of the offset. Optionally, the network device may transmit the configuration information through a broadcast message or an RRC message.

Optionally, the cluster head terminal may transmit the offset to the first terminal through SCI or a PC5-RRC signaling, or notify a terminal device in the communication group of the offset in multicast communication. The cluster head terminal may refer to a terminal having functions such as resource management, resource allocation, resource scheduling, resource coordination within a communication group of multicast communication, such as a first vehicle in a fleet of vehicles travelling in a queue or a vehicle at an intermediate position of the fleet of vehicles.

Optionally, the second terminal may carry the indication information in the SCI, or transmit the indication information through a PC5-RRC signaling when the first terminal and the second terminal establish a connection. Specifically, when the connection is established, the first terminal and the second terminal may perform interaction of configuration information through the PC5-RRC signaling, and the configuration information may carry the indication information.

Optionally, in some embodiments, the first terminal determines, based on a CRC sequence generated by the SCI transmitted by the second terminal, a frequency domain offset of a DMRS sequence corresponding to a PSFCH. Optionally, the SCI may specifically be a second-order SCI.

Optionally, in this embodiment, the DMRS sequence of the third-type sidelink feedback channel is determined based on at least one of: terminal identity information of the first terminal, terminal identity information of the second terminal, or a Cyclic Redundancy Check (CRC) sequence generated based on the SCI transmitted by the second terminal.

The determination method of the DMRS sequence of the third-type sidelink feedback channel refers to the related description of the determination method of the DMRS sequence of the second-type sidelink feedback channel in Embodiment 1, and details thereof are omitted here for brevity.

Optionally, in this embodiment, a scrambling sequence for scrambling the sidelink feedback information or the measurement result is determined based on at least one of: terminal identity information of the first terminal; terminal identity information of the second terminal; or a Cyclic Redundancy Check (CRC) sequence generated based on the SCI transmitted by the second terminal.

In the third-type sidelink feedback channel, the determination method of the scrambling sequence refers to the related description in Embodiment 1, and details thereof are omitted here for brevity.

It should be understood that, in the foregoing embodiments, the second-type sidelink feedback channel and the third-type sidelink feedback channel are only described by taking a slot granularity as an example in the time domain In other embodiments, another time unit may be designed as a granularity, that is, the slot of the second-type sidelink feedback channel and the third-type sidelink feedback channel may be replaced by another time unit. Similarly, in a frequency domain, the second-type sidelink feedback channel and the third-type sidelink feedback channel are only described by taking a PRB granularity as an example, In other embodiments, the second-type sidelink channel and the third-type sidelink feedback channel may be designed by taking another frequency domain unit as granularity, and details thereof are omitted here for brevity.

In some embodiments, the feedback information of the sidelink data channel may be at least one of: Hybrid Automatic Repeat reQuest-ACKnowledgement (HARQ-ACK); Channel Quality Indicator (CQI); Rank Indication (RI); or Precoding Matrix Indicator (PMI).

In some embodiments, a measurement result of the sidelink reference signal may include index information for determining a beam.

As an example, the index Information for determining the beam may be index information of a Channel State Information Reference Signal (CSI-RS).

Specifically, the transmitting terminal may transmit data in a beamforming manner to improve reliability and transmission distance of data transmission, and the receiving terminal may feedback index information of an optimal beam to the transmitting terminal. Specifically, one beam can be determined by the CSI-RS resource corresponding to the beam, so that index information of the CSI-RS resource is fed back to the transmitting terminal, and the receiving terminal can determine the optimal beam selected by the transmitting terminal based on the index information of the CSI-RS resource.

Method embodiments of the present disclosure are described in detail above in conjunction with FIG. 5 to FIG. 9, and apparatus embodiments of the present disclosure are described in detail below in conjunction with FIG. 10 to FIG. 12. It should be understood that apparatus embodiments correspond to method embodiments and that similar descriptions may be made with reference to method embodiments.

Figure 10:
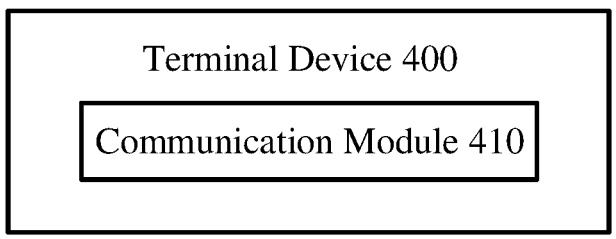
FIG. 10 is a schematic block diagram of a terminal device according to an embodiment of the present disclosure.

FIG. 10 illustrates a schematic block diagram of a terminal device 400 according to an embodiment of the present disclosure. As illustrated in FIG. 10, the terminal device 400 includes a communication module 410.

The communication module 410 is configured to receive a sideline data channel and/or a sideline reference signal transmitted by a second terminal; and transmit a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit.

Optionally, in some embodiments of the present disclosure, the first sidelink feedback channel is a second-type sidelink feedback channel, and the second-type sidelink feedback channel occupies all time domain symbols in a slot in a time domain that are available for sidelink transmission; or The first sidelink feedback channel is a third-type sidelink feedback channel, the third-type sidelink feedback channel occupies a second-to-last time domain symbol and a third-to-last time domain symbol in all time domain symbols in a slot in the time domain that are available for sidelink transmission, and the third-type sidelink feedback channel occupies N Physical Resource Blocks (PRBs) in frequency domain, where N is a positive integer greater than 1.

Optionally, in some embodiments of the present disclosure, a last time domain symbol in all time domain symbols in a slot that are available for sidelink transmission is not used for transmitting the second-type sidelink feedback channel.

Optionally, in some embodiments of the present disclosure, N is a configuration parameter in resource pool configuration information, or N is predefined.

Optionally, in some embodiments of the present disclosure, the second-type sidelink feedback channel occupies M Physical Resource Blocks (PRBs) in the frequency domain, where M is a positive integer.

Optionally, in some embodiments of the present disclosure, M is a configuration parameter in resource pool configuration information, or M is predefined.

Optionally, in some embodiments of the present disclosure, when the first sidelink feedback channel is the second-type sidelink feedback channel and the first sidelink feedback channel uses a same slot with a first-type sidelink feedback channel or the third-type sidelink feedback channel, time domain symbols used for transmitting the first sidelink feedback channel comprise no time domain symbol for transmitting the first-type sidelink feedback channel or the third-type sidelink feedback channel, the first-type sidelink feedback channel carrying sidelink feedback information of one bit.

Optionally, in some embodiments of the present disclosure, the first sidelink feedback channel is the second-type sidelink feedback channel, and in a slot, a time domain symbol used for transmitting a DeModulation Reference Signal (DMRS) sequence of the first sidelink feedback channel and a time domain symbol used for transmitting the first sidelink feedback channel are in time division.

Optionally, in some embodiments of the present disclosure, the resource pool configuration information of the first sidelink feedback channel comprises configuration information of at least one DMRS pattern indicating a time domain position available for transmission of the DMRS sequence.

Optionally, in some embodiments of the present disclosure, the at least one DMRS pattern comprises a plurality of DMRS patterns, and the terminal device further includes a determination module configured to determine based on first information, a target DMRS pattern used for transmitting the first sidelink feedback channel from the plurality of DMRS patterns, the first information indicating a specific DMRS pattern.

Optionally, in some embodiments of the present disclosure, the first information is transmitted by the second terminal to the terminal device; or the first information is transmitted by a network device to the terminal device; or the first information is transmitted by a cluster head terminal to the terminal device.

Optionally, in some embodiments of the present disclosure, the first information is transmitted by the second terminal to the terminal device through Sidelink Control Information (SCI) or a PC5-RRC signaling; the first information is transmitted by the network device through a broadcast message or a Radio Resource Control (RRC) signaling; and the first information is transmitted by the cluster head terminal to the terminal device through SCI or a PC5-RRC signaling.

Optionally, in some embodiments of the present disclosure, the first sidelink feedback channel is the third-type sidelink feedback channel, and on time domain symbols carrying the first sidelink feedback channel, a DMRS sequence of the first sidelink feedback channel and the first sidelink feedback channel are in frequency division.

Optionally, in some embodiments of the present disclosure, frequency domain units of two adjacent DRMS sequences are spaced by 3 subcarriers.

Optionally, in some embodiments of the present disclosure, the terminal device further includes: a determination module configured to determine an offset of a frequency domain position of a first DMRS sequence in one PRB relative to a first subcarrier.

Optionally, in some embodiments of the present disclosure, the determination module is further configured to determine the offset based on at least one of: configuration information of the network device, configuration information of the cluster head terminal, indication information of the second terminal, a CRC sequence generated based on SCI transmitted by the second terminal, identity information of the terminal device, identity information of the second terminal, or group identity information of a communication group to which the terminal device belongs.

Optionally, in some embodiments of the present disclosure, the indication information of the second terminal is transmitted through the Sidelink Control Information (SCI) or the PC5-RRC signaling, the configuration information of the network device is transmitted through a broadcast message or a Radio Resource Control (RRC) signaling, and the configuration information of the cluster head terminal is transmitted by a multicast message.

Optionally, in some embodiments of the present disclosure, a DMRS sequence of the second-type sidelink feedback channel is determined based on at least one of: terminal identity information of the terminal device; terminal identity information of the second terminal; or a Cyclic Redundancy Check (CRC) sequence generated based on SCI transmitted by the second terminal.

Optionally, in some embodiments of the present disclosure, a DMRS sequence of the third-type sidelink feedback channel is determined based on at least one of: terminal identity information of the terminal device; terminal identity information of the second terminal; or a Cyclic Redundancy Check (CRC) sequence generated based on SCI transmitted by the second terminal.

Optionally, in some embodiments of the present disclosure, a scrambling sequence used for scrambling the sidelink feedback information or the measurement result is determined based on at least one of: terminal identity information of the terminal device; terminal identity information of the second terminal; or a Cyclic Redundancy Check (CRC) sequence generated based on SCI transmitted by the second terminal.

Optionally, in some embodiments of the present disclosure, the terminal identity information of the terminal device is cell identity information of a cell to which the terminal device belongs or intra-group identity information of a terminal group to which the terminal device belongs; the terminal identity information of the second terminal is cell identity information of a cell to which the second terminal belongs or intra-group identity information of a terminal group to which the second terminal belongs.

Optionally, in some embodiments, the communication module may be a communication interface or a transceiver, or an input/output interface of a communication chip or a system on a chip. The determination module may be one or more processors.

It should be understood that the terminal device 400 according to the embodiment of the present disclosure may correspond to the terminal device in any of the method embodiments of the present disclosure, and the above and other operations and/or functions of each unit in the terminal device 400 are respectively for implementing a corresponding flow of the first terminal in the method 200 shown in FIG. 5, and details thereof are omitted here for brevity.

Figure 11:
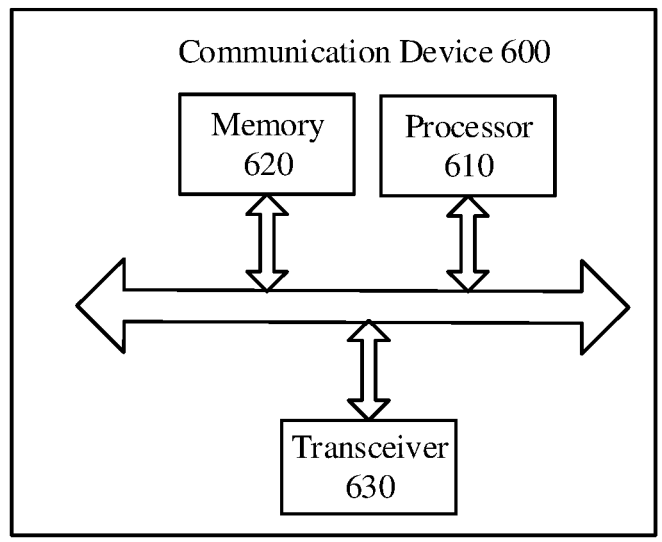
FIG. 11 is a schematic block diagram of a communication device according to another embodiment of the present disclosure.

FIG. 11 is a schematic structural diagram of a communication device 600 according to an embodiment of the present disclosure. The communication device 600 shown in FIG. 11 includes a processor 610, and the processor 610 may invoke and execute a computer program from a memory to implement any of the methods in the embodiments of the present disclosure.

Optionally, as shown in FIG. 11, the communication device 600 may further include a memory 620. The processor 610 is configured to invoke and execute the computer program from the memory 620 to perform any of the methods in the embodiments of the present disclosure.

The memory 620 may be a separate device from the processor 610 or may be integrated into the processor 610.

Optionally, as shown in FIG. 11, the communication device 600 may further include a transceiver 630, and the processor 610 may control the transceiver 630 to communicate with other devices, and in particular, may transmit information or data to the other devices or receive information or data transmitted by the other devices.

The transceiver 630 may include a transmitter and a receiver. The transceiver 630 may further include one or more antennas.

Optionally, the communication device 600 may specifically be a network device according to any of the embodiments of the present disclosure, and the communication device 600 may implement a corresponding process implemented by the network device in any of the methods according to embodiments of the present disclosure, and details thereof are omitted here for brevity.

Optionally, the communication device 600 may specifically be a mobile terminal/terminal device according to any of the embodiments of the present disclosure, and the communication device 600 may implement a corresponding process implemented by the mobile terminal/terminal device in any of the methods according to embodiments of the present disclosure, and details thereof are omitted here for brevity.

Figure 12:
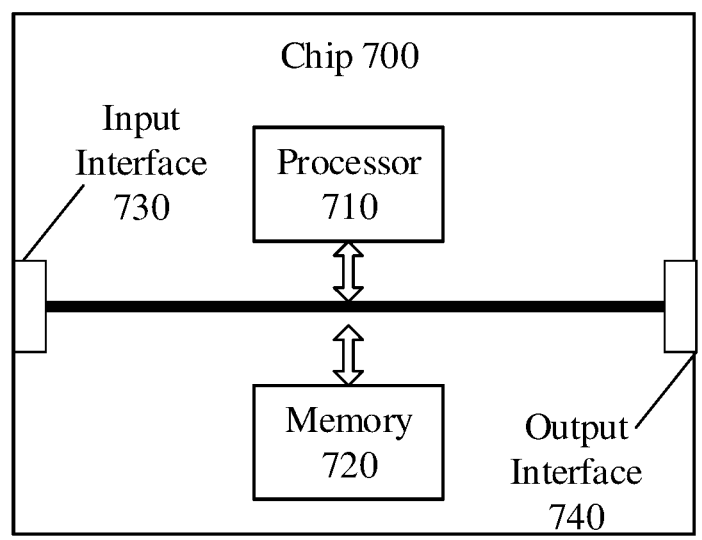
FIG. 12 is a schematic block diagram of a chip according to an embodiment of the present disclosure.

FIG. 12 is a schematic structural diagram of a chip of an embodiment of the present disclosure. The chip 700 shown in FIG. 12 includes a processor 710, and the processor 710 is configured to invoke and execute a computer program stored in a memory to implement the method in any of the embodiments of the present disclosure.

Optionally, as shown in FIG. 12, the chip 700 may further include a memory 720. The processor 710 is configured to invoke and execute a computer program from the memory 720 to implement the method according to any of the embodiments of the present disclosure.

The memory 720 may be a separate device from the processor 710 or may be integrated into the processor 710.

Optionally, the chip 700 may further include an input interface 730. The processor 710 may control the input interface 730 to communicate with other devices or chips, and in particular, to obtain information or data transmitted by the other devices or chips.

Optionally, the chip 700 may further include an output interface 740. The processor 710 may control the output interface 740 to communicate with other devices or chips, and in particular, to output information or data to the other devices or chips.

Optionally, the chip may be applied in the network device in any of the embodiments of the present disclosure, and the chip may implement a corresponding process implemented by the network device in any of the methods according to the embodiments of the present disclosure, and details thereof are omitted here for brevity.

Optionally, the chip may be applied in the mobile terminal/terminal device in any of the embodiments of the present disclosure, and the chip may implement a corresponding process implemented by the mobile terminal/terminal device in any of the methods according to the embodiments of the present disclosure, and details thereof are omitted here for brevity.

It should be understood that the chips mentioned in any of the embodiments of the present disclosure may also be referred to as a system-level chip, a system-chip, a chip system, or a system-on-chip.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Raste SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure further provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A wireless communication method, comprising:
receiving, by a first terminal, a sidelink data channel and/or a sidelink reference signal transmitted by a second terminal;
transmitting, by the first terminal, a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit;
wherein the first sidelink feedback channel is a second-type sidelink feedback channel, the second-type sidelink feedback channel occupies all time domain symbols in a slot in time domain that are available for sidelink transmission; or
the first sidelink feedback channel is a third-type sidelink feedback channel, the third-type sidelink feedback channel occupies a second-to-last time domain symbol and a third-to-last time domain symbol in all time domain symbols in a slot in the time domain that are available for sidelink transmission, and the third-type sidelink feedback channel occupies N Physical Resource Blocks (PRBs) in frequency domain, where N is a positive integer greater than 1.

2. The method according to claim 1, wherein a last time domain symbol in all time domain symbols in a slot that are available for sidelink transmission is not used for transmitting the second-type sidelink feedback channel.

3. The method according to claim 1, wherein the first sidelink feedback channel is the second-type sidelink feedback channel, and in a slot, a time domain symbol used for transmitting a DeModulation Reference Signal (DMRS) sequence of the first sidelink feedback channel and a time domain symbol used for transmitting the first sidelink feedback channel are in time division.

4. The method according to claim 3, wherein the resource pool configuration information of the first sidelink feedback channel comprises configuration information of at least one DMRS pattern indicating a time domain position available for transmission of the DMRS sequence.

5. The method according to claim 1, wherein the first sidelink feedback channel is the third-type sidelink feedback channel, and on time domain symbols carrying the first sidelink feedback channel, a DMRS sequence of the first sidelink feedback channel and the first sidelink feedback channel are in frequency division.

6. The method according to claim 5, further comprising:
determining an offset of a frequency domain position of a first DMRS sequence in one PRB relative to a first subcarrier based on at least one of: configuration information of the network device, configuration information of a cluster head terminal, indication information of the second terminal, a CRC sequence generated based on SCI transmitted by the second terminal, identity information of the first terminal, identity information of the second terminal, or group identity information of a communication group to which the first terminal belongs.

7. The method according to claim 1, wherein a DMRS sequence of the second-type sidelink feedback channel is determined based on at least one of:
terminal identity information of the first terminal;
terminal identity information of the second terminal; or
a Cyclic Redundancy Check (CRC) sequence generated based on SCI transmitted by the second terminal.

8. The method according to claim 1, wherein a DMRS sequence of the third-type sidelink feedback channel is determined based on at least one of:
terminal identity information of the first terminal;
terminal identity information of the second terminal; or
a Cyclic Redundancy Check (CRC) sequence generated based on SCI transmitted by the second terminal.

9. A terminal device, comprising a processor and a memory, wherein the memory is configured to store a computer program, and the processor is configured to invoke and execute the computer program stored in the memory to:
receive a sidelink data channel and/or a sidelink reference signal transmitted by a second terminal; and
transmit a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit;
wherein the first sidelink feedback channel is a second-type sidelink feedback channel, and the second-type sidelink feedback channel occupies all time domain symbols in a slot in time domain that are available for sidelink transmission; or
the first sidelink feedback channel is a third-type sidelink feedback channel, the third-type sidelink feedback channel occupies a second-to-last time domain symbol and a third-to-last time domain symbol in all time domain symbols in a slot in the time domain that are available for sidelink transmission, and the third-type sidelink feedback channel occupies N Physical Resource Blocks (PRBs) in frequency domain, where N is a positive integer greater than 1.

10. The terminal device according to claim 9, wherein a last time domain symbol in all time domain symbols in a slot that are available for sidelink transmission is not used for transmitting the second-type sidelink feedback channel.

11. The terminal device according to claim 9, wherein the first sidelink feedback channel is the second-type sidelink feedback channel, and in a slot, a time domain symbol used for transmitting a DeModulation Reference Signal (DMRS) sequence of the first sidelink feedback channel and a time domain symbol used for transmitting the first sidelink feedback channel are in time division.

12. The terminal device according to claim 11, wherein the resource pool configuration information of the first sidelink feedback channel comprises configuration information of at least one DMRS pattern indicating a time domain position available for transmission of the DMRS sequence.

13. The terminal device according to claim 9, wherein the first sidelink feedback channel is the third-type sidelink feedback channel, and on time domain symbols carrying the first sidelink feedback channel, a DMRS sequence of the first sidelink feedback channel and the first sidelink feedback channel are in frequency division.

14. The terminal device according to claim 13, wherein the processor is further configured to invoke and execute the computer program stored in the memory to:
determine an offset of a frequency domain position of a first DMRS sequence in one PRB relative to a first subcarrier based on at least one of: configuration information of the network device, configuration information of a cluster head terminal, indication information of the second terminal, a CRC sequence generated based on SCI transmitted by the second terminal, identity information of the terminal device, identity information of the second terminal, or group identity information of a communication group to which the terminal device belongs.

15. The terminal device according to claim 9, wherein a DMRS sequence of the second-type sidelink feedback channel is determined based on at least one of:
terminal identity information of the terminal device;
terminal identity information of the second terminal; or
a Cyclic Redundancy Check (CRC) sequence generated based on SCI transmitted by the second terminal.

16. The terminal device according to claim 9, wherein a DMRS sequence of the third-type sidelink feedback channel is determined based on at least one of:
terminal identity information of the terminal device;
terminal identity information of the second terminal; or
a Cyclic Redundancy Check (CRC) sequence generated based on SCI transmitted by the second terminal.

17. A non-transitory computer-readable storage medium, configured to store a computer program that enables a computer to:
receive a sidelink data channel and/or a sidelink reference signal transmitted by a second terminal; and
transmit a first sidelink feedback channel to the second terminal, the first sidelink feedback channel carrying sidelink feedback information of the sidelink data channel and/or a measurement result of the sidelink reference signal, and the first sidelink feedback channel carrying information of more than one bit;

wherein the first sidelink feedback channel is a second-type sidelink feedback channel, the second-type sidelink feedback channel occupies all time domain symbols in a slot in time domain that are available for sidelink transmission; or the first sidelink feedback channel is a third-type sidelink feedback channel, the third-type sidelink feedback channel occupies a second-to-last time domain symbol and a third-to-last time domain symbol in all time domain symbols in a slot in the time domain that are available for sidelink transmission, and the third-type sidelink feedback channel occupies N Physical Resource Blocks (PRBs) in frequency domain, where N is a positive integer greater than 1.

* * * * *